(12) United States Patent
Perego et al.

(10) Patent No.: US 11,806,981 B2
(45) Date of Patent: Nov. 7, 2023

(54) USE OF HIGH BARRIER AND PEELABLE POLYESTER FILM FOR TRAY LIDDING, DUAL OVENABLE PACKAGING APPLICATIONS AND TRAY LIDDING DUAL OVENABLE PACKAGES OBTAINED THEREFROM

(71) Applicant: Cryovac, LLC, Charlotte, NC (US)

(72) Inventors: Vittorio Perego, Busto Arsizio (IT); Serena Stracuzzi, Parabiago (IT)

(73) Assignee: Cryovac, LLC, Charlotte, NC (US)

(*) Notice: Subject to any disclaimer, the term of this patent is extended or adjusted under 35 U.S.C. 154(b) by 882 days.

(21) Appl. No.: 16/754,568

(22) PCT Filed: Oct. 9, 2018

(86) PCT No.: PCT/EP2018/077516
§ 371 (c)(1),
(2) Date: Apr. 8, 2020

(87) PCT Pub. No.: WO2019/072872
PCT Pub. Date: Apr. 18, 2019

(65) Prior Publication Data
US 2020/0254724 A1    Aug. 13, 2020

(30) Foreign Application Priority Data
Oct. 9, 2017  (EP) .................... 17195475

(51) Int. Cl.
*B32B 27/08* (2006.01)
*B32B 27/36* (2006.01)
(Continued)

(52) U.S. Cl.
CPC .............. *B32B 7/12* (2013.01); *B32B 27/08* (2013.01); *B32B 27/32* (2013.01); *B32B 27/36* (2013.01);
(Continued)

(58) Field of Classification Search
CPC ......... B65D 81/34–3461; B32B 27/36; B32B 2307/518; B32B 2260/046; B32B 2250/04; B32B 2250/05
(Continued)

(56) References Cited

U.S. PATENT DOCUMENTS

| 2,762,720 | A | | 9/1956 | Michel |
| 4,765,999 | A | * | 8/1988 | Winter ............... B65D 81/3469 426/118 |

(Continued)

FOREIGN PATENT DOCUMENTS

| EP | 1529797 A1 | 5/2005 |
| EP | 1588845 A1 | 10/2005 |

(Continued)

*Primary Examiner* — Michael C Romanowski
(74) *Attorney, Agent, or Firm* — Jason R. Womer (57) ABSTRACT

The present invention relates to the use of a laminate film, which can be transparent or white or colored (as described in the specification), comprising a first bi-axially oriented polyester film laminated to a second bi-axially oriented polyester film, wherein said first bi-axially oriented polyester film comprises a polyester base film comprising at least one polyester layer comprising one or more co-polyester(s) comprising units of terephthalic acid and at least a diol, said second bi-axially oriented polyester film comprises a polyethylene terephthalate base film, an inorganic vapor deposited layer, and an optional outer protective layer directly adhered to said inorganic vapor deposited layer, said inorganic vapor deposited layer comprising an inorganic compound selected from the group consisting of oxides, nitrides and oxynitrides of Al, Ti, Si, Zn, Sn, and mixture thereof, and a glue layer is interposed between said first bi-axially oriented polyester film and said second bi-axially oriented polyester film, and wherein said laminate film has (i) a tear ratio, between the tear initiation force measured according to ASTM D-1004 and said first bi-axially oriented polyester (Continued)

film total thickness, of at least 37 gf/micron in at least one of longitudinal and transverse direction, and (ii) a free shrink measured according to modified ISO11501-95 at 180° C. for 5 minutes lower than 5% in at least one of longitudinal and transverse direction, as a lid in tray lidding applications and to the tray lidding packages made therefrom.

19 Claims, 2 Drawing Sheets

(51) Int. Cl.
  *B32B 7/12* (2006.01)
  *B65D 43/00* (2006.01)
  *B65D 81/34* (2006.01)
  *B32B 27/32* (2006.01)

(52) U.S. Cl.
  CPC ....... B65D 81/343 (2013.01); B65D 81/3446 (2013.01); *B32B 2250/244* (2013.01); *B32B 2307/308* (2013.01); *B32B 2307/31* (2013.01); *B32B 2307/4023* (2013.01); *B32B 2307/412* (2013.01); *B32B 2307/518* (2013.01); *B32B 2307/724* (2013.01); *B32B 2307/746* (2013.01)

(58) Field of Classification Search
  USPC .............................................. 428/34.1–36.92
  See application file for complete search history.

(56) References Cited

U.S. PATENT DOCUMENTS

| | | | | |
|---|---|---|---|---|
| 4,962,000 | A | * | 10/1990 | Emslander ............. B32B 27/36 219/730 |
| 5,039,001 | A | * | 8/1991 | Kinigakis ............ B65D 77/225 426/118 |
| 5,942,320 | A | | 8/1999 | Miyake et al. |
| 6,543,208 | B1 | * | 4/2003 | Kobayashi ............... B32B 7/02 428/483 |
| 6,623,821 | B1 | * | 9/2003 | Kendig .................. C08J 7/0423 428/458 |
| 8,318,276 | B2 | | 11/2012 | Jahromi et al. |
| 8,865,295 | B2 | | 10/2014 | Jahromi et al. |
| 2002/0012803 | A1 | * | 1/2002 | Kending ................ B32B 27/08 53/442 |
| 2004/0052993 | A1 | * | 3/2004 | Dawes .................... B32B 27/34 428/35.7 |
| 2005/0031814 | A1 | * | 2/2005 | Dawes ...................... B32B 7/06 428/347 |
| 2005/0074598 | A1 | * | 4/2005 | Peiffer ................... B32B 27/20 428/323 |
| 2005/0084636 | A1 | * | 4/2005 | Papenfuss .............. B32B 27/08 428/43 |
| 2007/0141313 | A1 | | 6/2007 | Burki et al. |
| 2010/0221391 | A1 | * | 9/2010 | Deng ....................... C08J 7/043 220/573.1 |
| 2014/0065431 | A1 | * | 3/2014 | Sakellarides .......... B32B 27/36 428/480 |
| 2014/0234493 | A1 | | 8/2014 | Forloni |
| 2015/0283029 | A1 | * | 10/2015 | Riis ........................ B32B 15/20 206/438 |
| 2016/0009942 | A1 | | 1/2016 | Horiike et al. |
| 2016/0017491 | A1 | | 1/2016 | Koyama et al. |
| 2016/0265111 | A1 | * | 9/2016 | Horiike .................. B32B 27/36 |

FOREIGN PATENT DOCUMENTS

| | | | |
|---|---|---|---|
| EP | 2100726 A1 | 9/2009 | |
| JP | H06190969 A | 7/1994 | |
| WO | 199823443 A2 | 6/1998 | |
| WO | 2007093495 A1 | 8/2007 | |
| WO | WO-2015189351 A1 * | 12/2015 | ............... B32B 1/02 |
| WO | 2016083521 A1 | 6/2016 | |
| WO | 2016207587 A1 | 12/2016 | |
| WO | WO-2016207587 A1 * | 12/2016 | |

* cited by examiner

USE OF HIGH BARRIER AND PEELABLE POLYESTER FILM FOR TRAY LIDDING, DUAL OVENABLE PACKAGING APPLICATIONS AND TRAY LIDDING DUAL OVENABLE PACKAGES OBTAINED THEREFROM

TECHNICAL FIELD

The present invention relates to the use of polyester films in tray lidding food-packaging operations and to tray lidding packages obtained therefrom. More in particular, the invention preferably relates to dual ovenable packages provided with a high barrier polyester lid.

BACKGROUND ART

Polyester films are commonly used as lidding films, in particular for ovenable containers. Packaging systems comprising a rigid heat-stable container having a thin flexible thermoplastic film sealed onto it are commonly used for the packaging of so-called "ready-meals", that is food products which only require heating to be ready for consumption.

Heating can be carried out in a microwave or in a conventional oven. Due to the temperatures involved in the heating step only few materials can be used for the container, such as aluminum, polyester-coated cardboard or poly(ethylene terephthalate) (PET). Crystalline PET (CPET) containers are especially suitable for both applications, while amorphous PET (APET) containers are suitable for microwave only. To improve the heat-sealability of these containers with the lidding films often the CPET container comprises a layer of APET as the food contact layer.

In order to further improve the heat-sealability of the PET lidding film to the container or to itself, a heat-sealable layer of a lower melting material is usually provided on the film. The heat-sealable layer may be coextruded with the PET base layer that is extruded simultaneously through a single die, as described in EP-A-1,529,797 and WO2007/093495.

Alternatively, the heat-sealable layer may be solvent- or extrusion-coated over the base layer. Heat-shrinkable polyester films comprising a solvent-based heat-sealable coating are known. For instance, U.S. Pat. No. 2,762,720 discloses a PET film having a shrink of at least 10% at 100° C. in at least one direction provided with a heat-sealable coating of a vinylidene chloride copolymer.

Additionally, WO2016/83521 discloses a bi-axially oriented coated polyester film comprising a polyester base film and a heat sealable coating, wherein said heat sealable coating comprises one or more amorphous copolyester(s) comprising units of terephthalic acid, naphthalene dicarboxylic acid and at least a diol, and wherein the heat-sealable coating contains from 20 to 50% by weight of terephthalic acid units and from 5 to 25% by weight of naphthalene dicarboxylic acid units.

When using lidding films for shelf stable packaged product, the lidding films should maintain the hermeticity and oxygen barrier properties both during sterilization treatment, a necessary step for shelf stable packaged products in order to guarantee the shelf life of the product at room temperature for at least 24 months, and for the whole life of the product.

Such lidding films are usually white or colored to avoid the visual appearance of the content until to the opening of the package.

The Applicant has observed that, when sealed at the condition needed to get the required hermeticity, most of the coated films disclosed in the art do not open cleanly and show tearing when peeled off the trays.

The Applicant has also observed that, when the packaged products are heat-treated for regeneration by microwave or conventional oven, an excessive shrink of the polyester film closing the package can cause distortion or even breakage of the package. This issue has become particularly important in the last years not only because the use of containers (e.g., trays or more generally supports) containing recycled or scrap materials but also for their thickness reduction to make them more environment friendly, thus worsening their mechanical properties, in particular their resistance to deformation.

Furthermore, an ideal packaging film should ensure good hermeticity and clean peelability without tearing in order to provide packages with a satisfactory functionality in addition to an appealing appearance and that functionality should be preserved during and after sterilization treatment, under the most common packaging and storage conditions, and over time for the entire package life.

US20050084636A1 in the name of Bemis discloses glue laminated barrier polyester films used for manufacturing flexible bags. The opening of these bags is not carried out along the seals but by rupturing the film, facilitated by a tear initiation area and a directional tear zone. This document does not mention or suggest the use of these laminate films in tray lidding applications.

JP406190969A in the name of Toray relates to flexible polyester film laminated with thin films and their use in manufacturing flexible pouches for packaging liquid products. This document does not deal with the opening of the pouches or the use of the laminates in tray lidding applications.

SUMMARY OF THE INVENTION

When facing with the above mentioned problems of lack of hermeticity or bad peelability with tearing of the lid and package deformation, the Applicant has surprisingly found out that a bi-axially oriented sealable polyester film having certain tear initiation force values, in particular certain tear ratios values, when glue laminated with a bi-axially oriented polyester film coated with an inorganic vapor deposited layer and having certain free shrink values, was able to provide good hermeticity and peelability when applied to polyester-based containers, with no tearing when peeled off said trays and no excessive shrink during heat-treatment. These features, in particular the easy peelability with no tearing or delamination, are particularly appreciated by packers and final consumers and were not expected to be found and maintained after the glue lamination of the above mentioned bi-axially oriented polyester films.

Further, the Applicant observed that when using white pigmented polyester films in the manufacturing of laminate films, the oxygen barrier properties of the inorganic layer in the resulting laminate film dramatically worsen after the sterilization treatment.

The same happened when attempting to print a white ink layer directly onto the inorganic vapor deposited layer of a transparent polyester film, when said inorganic layer has no protective layer adhered thereto.

Unexpectedly, the Applicant also found that when superposing a protective layer on the surface of the inorganic layer to be printed, a white ink layer can be printed without showing any decay of the barrier properties, and still maintaining all the above mentioned hermeticity and peelability characteristics.

The present films are suitable for shelf stable ready meals applications, i.e. when thermal treatments are involved; such films in fact could withstand pasteurization step at 98° C., sterilization at 123° C., and perform well in both microwave and conventional ovens. After these harsh heat-treatments, a clean peelability without tearing or without delamination is remarkably maintained.

Therefore, an object of the present invention is an easy openable dual ovenable tray lidding package comprising a container, a product and a lid sealed onto said container, wherein the lid is a laminate film, which is either a transparent laminate film comprising a first bi-axially oriented polyester film laminated to a second bi-axially oriented polyester film, wherein said first bi-axially oriented polyester film comprises a polyester base film, comprising at least one polyester layer comprising one or more co-polyester(s) comprising units of terephthalic acid and at least a diol, said second bi-axially oriented polyester film comprises a polyethylene terephthalate base film, an inorganic vapor deposited layer, and an optional outer protective layer directly adhered to said inorganic vapor deposited layer, said inorganic vapor deposited layer comprising an inorganic compound selected from the group consisting of oxides, nitrides and oxynitrides of Al, Ti, Si, Zn, Sn, and mixture thereof, and wherein a glue layer is interposed between said first bi-axially oriented polyester film and the inorganic vapor deposited layer or the protective layer, if present, of said second bi-axially oriented polyester film, or a white or colored laminate film comprising a first bi-axially oriented polyester film laminated to a second bi-axially oriented polyester film, wherein said first bi-axially oriented polyester film comprises a polyester base film comprising at least one polyester layer comprising one or more co-polyester(s) comprising units of terephthalic acid and at least a diol, said second bi-axially oriented polyester film comprises a polyethylene terephthalate base film, an inorganic vapor deposited layer, and an optional outer protective layer directly adhered to said inorganic vapor deposited layer, said inorganic vapor deposited layer comprising an inorganic compound selected from the group consisting of oxides, nitrides and oxynitrides of Al, Ti, Si, Zn, Sn, and mixture thereof, and wherein a glue layer is interposed between said first bi-axially oriented polyester film and the inorganic vapor deposited layer or the protective layer, if present, of said second bi-axially oriented polyester film, and an ink layer is interposed between said first bi-axially oriented polyester film and the glue layer and/or between the glue layer and said protective layer of said second bi-axially oriented polyester film, and wherein said laminate film has a tear ratio, between the tear initiation force measured according to ASTM D-1004 and said laminate film total thickness, of at least 37 gf/micron in at least one of longitudinal and transverse direction, and a free shrink measured according to modified ISO11501-95 at 180° C. for 5 minutes lower than 5% in at least one of longitudinal and transverse direction.

A further object of the present invention is a process for manufacturing a package according to present invention.

A further object of the present invention is the use of the laminate film described above for packaging food, preferably as lid in tray lidding, preferably for tray lidding of food, more preferably for tray lidding of food for cook-in applications, such as for ready meals.

A further object of the present invention is a transparent or white or coloured laminate film as described above, for use as a lid in tray lidding, characterized in that the glue layer is made of a polyurethane adhesive derived from a base resin selected from the group consisting of polyester polyols, polyurethane polyols, polycarbonate polyols, acrylic polyols, polyether polyols and polyolefin polyols, and a curing agent, selected from the group consisting of polyisocyanate compounds having two or more isocyanate groups in one molecule.

Definitions

The term "modified ISO11501-95" is used herein to refer to an ISO11501-95 modified as described in Example 3 hereinbelow.

The term "polyester" is used herein to refer to both homo- and co-polyesters, wherein homo-polyesters are defined as polymers obtained from the condensation of one dicarboxylic acid with one diol and co-polyesters are defined as polymers obtained from the condensation of one or more dicarboxylic acids with one or more diols. Suitable polyester resins are, for instance, polyesters of ethylene glycol and terephthalic acid, i.e. poly (ethylene terephthalate) (PET). Preference is given to polyesters that contain ethylene units and include, based on the dicarboxylate units, at least 90 mol %, more preferably at least 95 mol %, of terephthalate units. The remaining monomer units are selected from other dicarboxylic acids or diols. Suitable other aromatic dicarboxylic acids are preferably isophthalic acid, phthalic acid, 2,5-, 2,6- or 2,7-naphthalenedicarboxylic acid. Of the cycloaliphatic dicarboxylic acids, mention should be made of cyclohexanedicarboxylic acids (in particular cyclohexane-1,4-dicarboxylic acid). Of the aliphatic dicarboxylic acids, the ($C_3$-$C_{19}$)alkanedioic acids are particularly suitable, in particular succinic acid, sebacic acid, adipic acid, azelaic acid, suberic acid or pimelic acid.

Suitable diols are, for example aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol, optionally heteroatom-containing diols having one or more rings.

Co-polyester resins derived from one or more dicarboxylic acid(s) or their lower alkyl (up to 14 carbon atoms) diesters with one or more glycol(s), particularly an aliphatic or cycloaliphatic glycol may also be used as the polyester resins for the polyester base film. Suitable dicarboxylic acids include aromatic dicarboxylic acids such as terephthalic acid, isophthalic acid, phthalic acid, or 2,5-, 2,6- or 2,7-naphthalenedicarboxylic acid, and aliphatic dicarboxylic acids such as succinic acid, sebacic acid, adipic acid, azelaic acid, suberic acid or pimelic acid. Suitable glycol(s) include aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol. Examples of such copolyesters are (i) copolyesters of azelaic acid and terephthalic acid with an aliphatic glycol, preferably ethylene glycol; (ii) copolyesters of adipic acid and terephthalic acid with an aliphatic glycol, preferably ethylene glycol; and (iii) copolyesters of sebacic acid and terephthalic acid with an aliphatic glycol, preferably butylene glycol; (iv) co-polyesters of ethylene glycol, terephthalic acid and isophthalic acid. Suitable amorphous co-polyesters are those derived from an aliphatic diol and a cycloaliphatic diol with one or more, dicarboxylic acid(s), preferably an aromatic dicarboxylic acid. Typical amorphous co-polyesters include co-polyesters of terephthalic acid with an aliphatic diol and a cycloaliphatic diol, especially ethylene glycol and 1,4-cyclohexanedimethanol. The preferred molar ratios of the cycloaliphatic diol to the aliphatic diol are in the range from 10:90 to 60:40, preferably in the range from 20:80 to 40:60, and more preferably from 30:70 to 35:65.

The phrase "polyester film" or "polyester base film" as used herein relates to films comprising at least 70%, 80%, 90% by weight of the film of one or more (co)polyesters.

The phrase "ethylene-alpha-olefin copolymer" as used herein, refers to heterogeneous and to homogeneous polymers such as linear low density polyethylene (LLDPE) with a density usually in the range from about 0.900 g/cm$^3$ to about 0.930 g/cm$^3$, linear medium density polyethylene (LMDPE) with a density usually in the range from about 0.930 g/cm$^3$ to about 0.945 g/cm$^3$, and very low and ultra-low density polyethylene (VLDPE and ULDPE) with a density lower than about 0.915 g/cm$^3$, typically in the range from 0.868 to 0.915 g/cm$^3$, and such as Maleic Anhydride-Modified Ethylene/Butene Copolymer BYNEL™ resins obtainable from DuPont, metallocene-catalyzed EXACT™ and EXCEED™ homogeneous resins obtainable from Exxon, single-site AFFINITY™ resins obtainable from Dow, and TAFMER™ homogeneous ethylene-alpha-olefin copolymer resins obtainable from Mitsui. All these materials generally include co-polymers of ethylene with one or more co-monomers selected from ($C_4$-$C_{10}$)-alpha-olefin such as butene-1, hexene-1, octene-1, etc., in which the molecules of the copolymers comprise long chains with relatively few side chain branches or cross-linked structures.

As used herein, the phrase "modified polymer", as well as more specific phrases such as "modified ethylene/vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith. As used herein, the term "modified" refers to a chemical derivative, e.g. one having any form of anhydride functionality, such as anhydride of maleic acid, crotonic acid, citraconic acid, itaconic acid, fumaric acid, etc., whether grafted onto a polymer, copolymerized with a polymer, or blended with one or more polymers, and is also inclusive of derivatives of such functionalities, such as acids, esters, and metal salts derived therefrom.

As used herein, the phrase "anhydride-containing polymer" and "anhydride-modified polymer", refer to one or more of the following: (1) polymers obtained by copolymerizing an anhydride-containing monomer with a second, different monomer, and (2) anhydride grafted copolymers, and (3) a mixture of a polymer and an anhydride-containing compound.

The term "shelf stable packaged product" refers to a packaged product having a shelf life at ambient temperature of at least 24 months.

As used herein, the term "adhered" refers to film layers having a principal surface directly or indirectly (via one or more additional layers between them) in contact with one another via coextrusion, extrusion coating, or lamination via adhesive.

As used herein, films layers which are "directly adhered" have a principal surface in direct contact with one another, without an adhesive or other layer between them.

As used herein, the phrases "corona treatment" and "corona discharge treatment" refer to subjecting the outer surfaces of the film to a corona discharge treatment, i.e., the ionization of a gas such as air in close proximity to a film surface, the ionization initiated by a high voltage passed through a nearby electrode, and causing oxidation and other changes to the film surface, such as surface roughness. Corona treatment of polymeric materials is disclosed in e.g. U.S. Pat. No. 4,120,716.

As used herein, the phrases "longitudinal direction" and "machine direction", herein abbreviated "LD" or "MD", refer to a direction "along the length" of the film, i.e., in the direction of the film as the film is formed during coextrusion.

As used herein, the phrase "transverse direction" or "crosswise direction", herein abbreviated "TD", refers to a direction across the film, perpendicular to the machine or longitudinal direction.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process of extruding two or more materials through a single die with two or more orifices arranged so that the extrudates merge and weld together into a laminar structure before chilling, i.e., quenching.

As used herein, the term "orientation" refers to "solid state orientation" namely to the process of stretching of the cast film carried out at a temperature higher than the Tg (glass transition temperatures) of all the resins making up the layers of the structure and lower than the temperature at which all the layers of the structure are in the molten state. The solid-state orientation may be mono-axial, transverse or, preferably, longitudinal, or, preferably, bi-axial.

As used herein, the phrases "orientation ratio" and "stretching ratio" refer to the multiplication product of the extent to which the plastic film material is expanded in the two directions perpendicular to one another, i.e. the machine direction and the transverse direction. Thus, if a film has been oriented to three times its original size in the longitudinal direction (3:1) and three times its original size in the transverse direction (3:1), then the overall film has an orientation ratio of 3×3 or 9:1.

As used herein, the acronym "BO-PET" refers to biaxially oriented polyethylene terephthalate.

As used herein, the terms "vacuum deposition" or "vapor deposition" refer to a family of processes used to deposit layers of material atom-by-atom or molecule-by-molecule on a solid surface. These processes operate at pressures well below atmospheric pressure (i.e., vacuum). The material to be deposited may be a formulated monomer or oligomer in the form of a liquid or a solid. Upon application of vacuum and heat, the material evaporates and then deposits on the surface returning to its original state which may be liquid, solid or even gel, if the material is formulated using both a liquid and a solid. The process can be qualified as physical vapor deposition (PVD) or chemical vapor deposition (CVD) depending on the reactivity of the material.

As used herein, the term "vapor deposited layer" refers to a layer formed by vapor deposition.

As used herein, the term "tear ratio" refers to the ratio between the tear initiation force of a film measured according to ASTM D-1004 and the total thickness of such a film. For example, the "tear ratio" of the laminate film is the ratio between the tear initiation force of the laminate film measured according to ASTM D-1004 and the laminate film total thickness.

As used herein the phrases "heat-shrinkable," "heat-shrink," and the like, refer to the tendency of the solid-state oriented film to shrink upon the application of heat, i.e., to contract upon being heated, such that the size of the film decreases while the film is in an unrestrained state. The heat shrink behavior of an unrestrained film, is herein referred as "free shrink".

As used herein, the term "shrink tension at 200° C." refers to the value of tension at 200° C. developed by the clamped samples film (in each LD and TD direction) when subjected to a heating-cooling cycle according to the test method described under the present experimental section. The shrink tension is herein expressed as kg/cm². As used herein, the term "tray lidding" refers to a packaging application in which a package comprises a container (e.g. a tray), a product placed in the container and a lid sealed around, generally on a circumferential flange, thus air tightly enclosing the product and the inner atmosphere.

As used herein, the term "easy openable tray lidding package" refers to a package closed by a welded lid that can be opened manually in an easy way by simple pulling of the lid by the user. Easy openable means that not only is the lid easily removed without excessive effort, but also that the lid remains substantially intact after opening (no tearing).

DETAILED DESCRIPTION OF INVENTION

An object of the present invention is a package comprising a container, a product and a lid made of a laminate film sealed onto said container.

The laminate film of the package of the present invention comprises a first bi-axially oriented polyester film laminated to a second bi-axially oriented polyester film.

Preferably, the tear ratio of the laminate film is at least 39 gf/micron, more preferably at least 40 gf/micron, even more preferably at least 41 gf/micron, still more preferably at least 43 gf/micron or 46 gf/micron in at least one of longitudinal and transverse directions.

Preferably, the tear ratio of the laminate film is at least 39 gf/micron, more preferably at least 40 gf/micron, even more preferably at least 41 gf/micron, still more preferably at least 43 gf/micron or 46 gf/micron in both LD and TD.

Preferably, the free shrink of the laminate film measured according to modified ISO11501-95 at 180° C. for 5 minutes is lower than 4%, more preferably lower than 3%, even more preferably lower than 2%, still more preferably lower than 1% in at least one of longitudinal and transverse directions.

Preferably, the free shrink of the laminate film measured according to modified ISO11501-95 at 180° C. for 5 minutes is lower than 4%, more preferably lower than 3%, even more preferably lower than 2%, still more preferably lower than 1% in both LD and TD.

The first bi-axially oriented polyester film comprises a polyester base film comprising at least one polyester layer. The polyester base film may have any desired number of layers, typically from 1 to 10 layers, from 1 to 8 layers, from 1 to 5 layers, from 1 to 3 layers.

The polyester base film is characterized by a tear ratio, between the tear initiation force measured according to ASTM D-1004 and the base film total thickness, preferably of at least 37 gf/micron, preferably at least 39 gf/micron, more preferably at least 40 gf/micron, even more preferably at least 41 gf/micron, still more preferably at least 43 gf/micron or 46 gf/micron in at least one of longitudinal and transverse directions.

The polyester base film is characterized by a tear ratio, between the tear initiation force measured according to ASTM D-1004 and the base film total thickness, preferably of at least 37 gf/micron, preferably at least 39 gf/micron, more preferably at least 40 gf/micron, even more preferably at least 41 gf/micron, still more preferably at least 43 gf/micron or 46 gf/micron in both LD and TD directions.

The polyester base film is preferably characterized by a free shrink measured according to modified ISO11501-95 at 180° C. for 5 minutes is lower than 4%, more preferably lower than 3%, even more preferably lower than 2%, still more preferably lower than 1% in at least one of longitudinal and transverse directions.

Preferably, the free shrink of the polyester base film measured according to modified ISO11501-95 at 180° C. for 5 minutes is lower than 4%, more preferably lower than 3%, even more preferably lower than 2%, still more preferably lower than 1% in both LD and TD.

The skilled in the art is able to manufacture the present polyester base films according to the present description and to calculate the tear ratio as disclosed in WO2016/083521.

The total thickness of the polyester base film may vary within wide limits. It is preferably from 3 to 100 micron, in particular from 5 to 80 micron, preferably from 8 to 70 micron, even more preferably from 15 to 50 micron. In the most preferred embodiments, the total thickness of the polyester base film is lower than 35, than 30, than 25 or than 20 micron.

The total thickness of the polyester base film preferably is at least 5 or at least 10 or at least 15 micron.

The total thickness of the polyester base film preferably is at most 100 or at most 80 or at most 70 or at most 50 or at most 40 or at most 35 or at most 30 or at most 25 or at most 20 micron.

The thickness of the polyester base film is preferably at least 60% 70%, 80%, 90%, 95 or 97% of the total thickness of the first bi-axially oriented polyester film.

The polyester base film comprises at least 40%, 45%, 50%, 55%, 60%, 70%, 80%, 90% of the overall weight of the film of one or more (co)polyesters, preferably at least 50%, more preferably at least 70%, even more preferably at least 80%, 90%, 95%.

In a first embodiment of the package of the present invention, the polyester base film has only one layer.

The monolayer polyester base film may comprise any suitable homo- and/or co-polyester resin. Preferably, the polyester base film comprises at least 40 wt. %, 45%, 50%, 55%, 60%, 70%, 80% of poly(ethylene terephthalate).

Preferably, the poly(ethylene terephthalate) has an intrinsic viscosity (IV) of at least 0.75, or 0.76, 0.77, 0.78, 0.79 dl/g, even more preferably it has an IV of at least 0.80 0.80 dl/g. An example of such a polymer is PET 9921W® sold by Voridian a poly(ethylene terephthalate) polymer with a melting point $T_m$ of 245° C. and an IV of 0.80 dl/g. As used therein, intrinsic viscosity (IV) is defined as the limiting value of the reduced viscosity at infinite dilution of the polymer and is determined using a capillary viscometer. Suitable methods for the determination of the intrinsic viscosity are for instance ASTM method D4603-03 and Voridian's internal method VGAS-A-AN-G-V-1.

Suitable resins are EASTAPAK COPOLYESTER 9921 by Eastman Chemical and RAMAPET N180 by Indorama.

Mixtures or blends of any homo- and/or co-polyester can be used for the monolayer polyester base film wherein poly(ethylene terephthalate) represents 40%, 45%, 50%, 55%, 60%, 70%, 80% by weight of the polyester base film. Preferably the polyester base film comprises at least 40%, 45%, 50%, 55%, 60%, 70%, 80% by weight of poly(ethylene terephthalate) having an IV of at least 0.75 dl/g, even more preferably of at least 0.80 dl/g.

Any homo- and/or co-polyester can be blended with poly(ethylene terephthalate). For instance the polyester base film may comprise at least 40%, 45%, 50%, 55%, 60%, 70%, 80% by weight of poly(ethylene terephthalate) and not more than 60%, 55%, 50%, 45%, 40%, 30%, 20% by weight of an amorphous polyester resin. Suitable amorphous polyester resins are co-polyesters of terephthalic acid with an aliphatic diol and a cycloaliphatic diol, especially ethylene glycol and 1,4-cyclohexanedimethanol, like PETG Eastar® 6763 sold by Eastman, which comprises a copolyester of terephthalic acid, about 33 mole % 1,4-cyclohexane dimethanol and about 67 mole % ethylene glycol and which has a glass transition temperature $T_g$ of 81° C. Eastar® GN001 by Eastman Chemical can also be used (Density 1.27 g/cm$^3$, Glass Transition 78° C., Viscosity Intrinsic 0.75 dl.g).

Preferred polyester base films comprise at least 40%, 45%, 50%, 55%, 60%, 70%, 80% by weight of the poly (ethylene terephthalate) preferably having an IV of at least 0.75 and not more than 60%, 55%, 50%, 45%, 40%, 30%, 20% by weight of an amorphous polyester of terephthalic acid with ethylene glycol. For instance, the polyester base film may comprise from 45% to 100%, 50% to 80% by weight of poly(ethylene terephthalate) preferably having an IV of at least 0.75 and 0% to 55%, preferably 20% to 50% by weight of an amorphous polyester of terephthalic acid with ethylene glycol and 1,4-cyclohexanedimethanol.

Preferably, the polyester base film comprises, in addition to polyester resins, 3 to 40% by weight, preferably 10 to 25% by weight of a thermoplastic resin selected among: ethylene-alpha-olefin copolymers, polyamides, polystyrenes, in particular styrene-butadiene block copolymers, ionomers, ethylene/unsaturated carboxylic acid copolymers, such as ethylene/(meth)acrylic acid copolymers, ethylene/unsaturated esters copolymers, such as ethylene/vinyl acetate copolymers, ethylene/propylene copolymers and ethylene/cyclic olefin copolymers, such as ethylene/norbornene copolymers. Ethylene/(meth)acrylic acid copolymers and ethylene-alpha-olefin copolymers are preferred.

Preferably, the polyester base film comprises an LLDPE, even more preferably a modified LLDPE. In the most preferred embodiment, the content of the modified LLDPE ranges between 12 and 20% by weight based on the total weight of the base film. Suitable resin is BYNEL 4104 (2006) by DuPont.

Even more preferably, the polyester base film comprises a fluoropolymer containing LDPE. In the most preferred embodiment, the content of the fluoropolymer containing LDPE ranges between 0.5 and 5% by weight, preferably between 1 and 3% by weight based on the total weight of the base layer. Suitable fluoropolymer containing LDPE is Cesa®-process PEA0050633-BN available from Clariant Masterbatch GmbH.

In a second embodiment of the package of the present invention, the polyester base film has more than one layer. The multilayer polyester base film may have 2, 3, 4, 5, 6 or even a greater number of layers. The polyester base film preferably has 2 to 5 layers, even more preferably 2 to 3 layers.

Preferably, the layers of the polyester base film are coextruded, that is extruded simultaneously from a single die. Poly(ethylene terephthalate) may be present in one, in more than one or in all of the layers of the polyester base film. The layers of the polyester base film may have the same or different compositions with at least 40%, 45%, 50%, 55%, 60%, 70%, 80% of the overall weight of the polyester base film being made of poly(ethylene terephthalate). Preferably, the poly(ethylene terephthalate) has an IV of at least 0.75. Even more preferably, the poly(ethylene terephthalate) has an IV of at least 0.80.

The film may comprise a first layer comprising poly (ethylene terephthalate) and an additional layer. The additional layer may comprise any suitable thermoplastic resin, although a polyester resin is preferred. The polyester resin may be the same as the resin of the first layer or different. The thickness of the additional layer is generally between about 5 and 40% of the thickness of the first layer. The additional layer may have a thickness of up to about 25 micron, preferably up to about 15 micron, more preferably between about 0.5 and 10 micron, and more preferably between about 0.5 and 7 micron. A suitable two-layer film comprises a first layer comprising a blend of poly(ethylene terephthalate) and an amorphous polyester and an additional layer comprising the same amorphous polyester resin as the base layer. For instance, the first layer may comprise a blend of 45% to 100%, 50% to 80% by weight of poly(ethylene terephthalate) and 0% to 55%, 20% to 50% by weight of an amorphous polyester. The thickness of the layers is such that the amount by weight of poly(ethylene terephthalate) is at least 40%, 45%, 50%, 55%, 60%, 70%, 80% of the overall weight of the film. Preferably, the poly(ethylene terephthalate) has an IV of at least 0.75. Even more preferably, the poly(ethylene terephthalate) has an IV of at least 0.80.

A particularly suitable two layers film comprises a first layer, comprising 45% to 100%, 50% to 80% by weight of poly(ethylene terephthalate) preferably having an IV of at least 0.75 and 0% to 55%, 20% to 50% by weight of an amorphous polyester of terephthalic acid with ethylene glycol and 1,4-cyclohexanedimethanol, and an additional layer comprising the same amorphous polyester as the first layer. In case of a two-layer film, the lamination with the second bi-axially oriented polyester film is advantageously performed on the surface of the first layer.

A particularly suitable two layers film consists of a first layer, consisting of 50% to 80% by weight of poly(ethylene terephthalate) preferably having an IV of at least 0.75 and 20% to 50% by weight of an amorphous polyester of terephthalic acid with ethylene glycol and 1,4-cyclohexanedimethanol, and of an additional layer comprising the same amorphous polyester as the first layer.

Preferably, a suitable two-layer film comprises a first layer comprising an ethylene-alpha-olefin copolymer, more preferably an LLDPE, even more preferably a modified LLDPE in the range from 12 to 20% by weight based on the total weight of the base film. Suitable resin is BYNEL 4104 (2006) by DuPont.

Even more preferably, a suitable two-layer film comprises a first layer comprising a fluoropolymer containing LDPE. In the most preferred embodiment, the content of the fluoropolymer containing LDPE ranges between 0.5 and 5% by weight, preferably between 1 and 3% by weight based on the total weight of the base layer. Suitable fluoropolymer containing LDPE is Cesa®-process PEA0050633-BN available from Clariant Masterbatch GmbH.

The polyester base film may have a three-layer structure. Various combinations of layers can be used. In a preferred configuration, the polyester base film comprises a core layer comprising poly(ethylene terephthalate) and first and second outer layers on both sides of the core layer.

For instance, the three-layer film may comprise the core layer, a first and a second outer layer having the same composition and comprising a polyester resin different from the resin used in the core layer. Alternatively, the three-layer film may comprise the core layer comprising poly(ethylene terephthalate), a first outer layer and a second outer layer comprising the same polyester resin as the core layer.

A suitable three-layer film may comprise a core layer comprising at least 40%, 45%, 50%, 55%, 60%, 70%, 80% of poly(ethylene terephthalate) and not more than 60%, 55%, 50%, 45%, 40%, 30%, 20% of an amorphous polyester, a first outer layer comprising an amorphous polyester and a second outer layer comprising the same poly(ethylene terephthalate) as the core layer. Preferably, the amorphous polyester in the core layer is the same as the amorphous polyester in the first outer layer. Preferably, the poly(ethylene terephthalate) has an IV of at least 0.75. Even more preferably, the poly(ethylene terephthalate) has an IV of at least 0.80.

Alternatively, the three-layer film may comprise a core layer comprising a blend of poly(ethylene terephthalate) and of an amorphous polyester and a first and a second outer layers comprising an amorphous polyester. Preferably, the amorphous polyester in the core layer is the same as the amorphous polyester in the outer layers. A suitable amorphous polyester is for instance a copolymer of terephthalic acid with ethylene glycol and 1,4-cyclohexanedimethanol. In case of a three-layer film, the lamination with the second bi-axially oriented polyester film is advantageously performed on the surface of the first outer layer.

Preferably, a suitable three-layer film comprises a first outer layer comprising an ethylene-alpha-olefin copolymer, more preferably an LLDPE, even more preferably a modified LLDPE in the range from 12 to 20% by weight based on the total weight of the base film. Suitable resin is BYNEL 4104 (2006) by DuPont.

Even more preferably, a suitable three-layer film comprises a first outer layer comprising a fluoropolymer containing LDPE. In the most preferred embodiment, the content of the fluoropolymer containing LDPE ranges between 0.5 and 5% by weight, preferably between 1 and 3% by weight based on the total weight of the base layer. Suitable fluoropolymer containing LDPE is Cesa®-process PEA0050633-BN available from Clariant Masterbatch GmbH.

The thickness of the layers is such that the amount by weight of poly(ethylene terephthalate) is at least 40%, 45%, 50%, 55%, 60%, 70%, 80% of the overall weight of the film. Preferably, the poly(ethylene terephthalate) has an IV of at least 0.75. Even more preferably, the poly(ethylene terephthalate) has an IV of at least 0.80.

In general, the thickness of each outer layer is between about 5 and 40% of the thickness of the core layer. Each outer layer may have a thickness of up to about 25 micron, preferably up to about 15 micron, more preferably between about 0.5 and 10 micron, and even more preferably between about 0.5 and 7 micron. The thickness of the two outer layers may be the same or different.

The second bi-axially oriented polyester film comprises a polyethylene terephthalate base film, an inorganic vapor deposited layer, and optionally a protective layer directly adhered to the inorganic vapor deposited layer.

Preferably, the free shrink of the second bi-axially oriented polyester film measured according to modified ISO11501-95 at 180° C. for 5 minutes is lower than 4%, more preferably lower than 3%, even more preferably lower than 2%, still more preferably lower than 1% in at least one of longitudinal and transverse directions.

Preferably, the free shrink of the second bi-axially oriented polyester film measured according to modified ISO11501-95 at 180° C. for 5 minutes is lower than 4%, more preferably lower than 3%, even more preferably lower than 2%, still more preferably lower than 1% in both LD and TD.

Preferably, the oxygen permeability of the second bi-axially oriented polyester film, when measured under ASTM D3985 at 30° C. and 70% RH, is lower than 2 $cc/m^2/day$, more preferably lower than 1 $cc/m^2/day$, even more preferably lower than 0.5 $cc/m^2/day$.

Preferably, the water vapor transmission rate of the second bi-axially oriented polyester film, when measured under ASTM F1249 at 40° C. and 90% RH, is lower than 5 $g/m^2/day$, more preferably lower than 2 $g/m^2/day$, even more preferably lower than 1.5 $g/m^2/day$.

The polyethylene terephthalate base film has a glass transition point (Tg) which is preferably, but is not limited to, 50° C. or more. The thickness of the polyethylene terephthalate base film can be appropriately selected from a range of 12 μm or more to 200 μm or less.

The inorganic vapor deposited layer is disposed on a first surface of the polyethylene terephthalate base film. The inorganic vapor deposited layer is preferably formed by Atomic Layer Deposition (ALD) method to serve as a gas barrier layer (barrier layer). Useful inorganic vapor deposited layers include inorganic layers made of oxides, nitrides and oxynitrides of Al, Ti, Si, Zn, Sn, and mixture thereof.

Preferred inorganic vapor deposited layers include inorganic layers made of oxides of Al, Ti, Si, Zn, Sn, and mixture thereof.

It is particularly preferable that the inorganic vapor deposited layer is formed containing at least one of elements, Al, Ti, and Si among these materials, from the viewpoint of achieving high gas barrier properties, high durability and reducing cost.

The thickness of the inorganic vapor deposited layer can be in a range of 2 nm or more to 500 nm or less, for example. The inorganic vapor deposited layer, if its thickness is smaller than 2 nm, will have difficulty sufficiently serving as a gas barrier layer.

On the other hand, if the thickness of the inorganic vapor deposited layer is greater than 500 nm, cracks are likely to occur due to internal stresses in the inorganic vapor deposited layer. If the thickness of the inorganic vapor deposited layer is greater than 500 nm, it will be difficult to control the optical properties (e.g., light transmittance) of the film.

Therefore, by permitting the inorganic vapor deposited layer to have a thickness in a range of 2 nm or more to 500 nm or less, the function as a gas barrier layer can be sufficiently exerted, the occurrence of cracks can be reduced, and the optical properties can be controlled.

Preferably, the thickness of the inorganic vapor deposited layer is in a range of 2 nm or more to 100 nm or less.

An undercoat layer can be optionally provided between polyethylene terephthalate base film and the inorganic vapor deposited layer. The undercoat layer may contain inorganic substances, or may be formed containing organic macromolecules having a functional group in which the precursor of the inorganic vapor deposited layer can be easily bound. When the undercoat layer contains inorganic substances, the precursor, which is the source material of the inorganic vapor deposited layer, will be bound to the inorganic substances exposed on the surface layer of the undercoat layer. When the undercoat layer contains organic polymers, the organic polymers have a functional group that can easily be bound with the precursor of the inorganic vapor deposited layer. Hence, the precursors bound with each function group will also be bound together. Further details for the composition and preparation of the undercoat layer can be found in US Patent Publication 2016/009942.

Preferably, a protective layer is directly adhered to the inorganic vapor deposited layer to avoid scratches on the surface of the inorganic vapor deposited layer and deterioration of the gas barrier properties.

Preferably, the protective layer is present when an ink layer is printed onto the second biaxially oriented polyester film.

The protective layer may be composed of any material (organic material or inorganic material). The protective layer may be produced by a manufacturing method based on a wet coating technique or a dry coating technique. It is preferred that the protective layer is made of any material selected among oxide material, nitride materials, and oxynitride materials, each material being composed of water-soluble macromolecules and alkoxide metals, or each material containing at least one element selected from a group of Si, Al and Ti. Further details for the composition and preparation of the protective layer can be found in US Patent Publication 2016/009942.

Alternatively, the protective layer can be composed of a polymeric film adhered onto the inorganic vapor deposited layer by means of an adhesive layer, as described, for example, in US Patent Publication 2016/265111. The polymeric film is made of a plastic material such as polyethylene terephthalate (PET), polyethylene naphthalate (PEN), a polyimide film (PI), polyethylene (PE), polypropylene (PP), and polystyrene (PS). The protective layer can have a thickness appropriately selected from a range, which is from 0.1 μm or more to 200 μm or less, but is not limited to this range. The glue layer or adhesive layer of the laminate film may be formed, for example, by providing a coating of a dry lamination adhesive, followed by curing the dry lamination adhesive. For instance, as a dry lamination adhesive for serving as a base material of the adhesive layer, an adhesive derived from a base resin and a curing agent as principal components may be used. In this case, the dry lamination adhesive may contain a resin compound having a plurality of hydroxyl groups in a molecule and a polyisocyanate compound. Materials that may be used for the resin compound include, but are not limited to, polyester polyols, polyurethane polyols, polycarbonate polyols, acrylic polyols, polyether polyols, polyolefin polyols, and the like. As the curing agent configuring the dry lamination adhesive, materials containing a polyisocyanate compound having two or more isocyanate groups in one molecule may be used, for example.

Typically, the glue layer has a thickness from 0.5 to 6 micron, preferably from 2 to 5 micron.

The second bi-axially oriented polyester films useful for the laminate film typically are BOPET, i.e. biaxially oriented PET (polyethylene terephthalate) films having an inorganic vapor deposited barrier layer and, preferably, a protective layer commercially available, for instance, from Toppan USA, Inc. under the tradename GL Barrier Film, such as for example, GL-ARH Barrier Film.

Other suitable commercial films include FLEXALOX-PROTECT F-PGX by FlexFilm (BO-PET, AlOx coated, 12.5 microns), CERAMIS CPT 024 by Amcor (BO-PET, SiOx coated with overlacquer, 12 microns), Techbarrier LS by Mitsubishi Plastics (BO-PET, SiOx coated, 12 microns).

Examples of these films are reported in US Patent Publication No. 2016/009942, 2016/265111, and 2016/017491.

The laminate film may have no or negligible free shrink in air at temperatures up to 200° C. (for 5 minutes, under modified ISO11501-95 as described herein). The free shrink (in each direction) can be less than 5% at temperatures up to 160° C., up to 180° C., even up to 200° C. Preferably, the free shrink (in each direction) can be less than 4% at temperatures up to 200° C., less than 3% at temperatures up to 180° C., less than 2%, and even less than 1% at temperatures up to 160° C.

The maximum value of the shrink tension at 200° C. of the laminate film is typically not less than 5 kg/cm$^2$, 8 kg/cm$^2$ or even 9 kg/cm$^2$ in at least one direction. The maximum value of the shrink tension at 200° C. of the laminate film does not exceed 60 kg/cm$^2$, 50 kg/cm$^2$, 40 kg/cm$^2$, 30 kg/cm$^2$ in each direction. Usually the films have the following combination of free shrink/shrink tension properties in each direction: a shrink of less than 5% at 180° C. and a shrink tension not exceeding 60 kg/cm$^2$. Preferably, the films have a shrink in each direction of less than 5% at 180° C. and a shrink tension not exceeding 60 kg/cm$^2$ in each direction. Even more preferably, the films have a shrink in each direction of less than 5% at 180° C. and a shrink tension not exceeding 50 kg/cm$^2$ in each direction.

Preferably, the oxygen permeability of the laminated film when measured under ASTM D3985 at 23° C. and 0% RH, is lower than 2 cc/m$^2$/day, more preferably lower than 1 cc/m$^2$/day, even more preferably lower than 0.5 cc/m$^2$/day, even after pasteurization, sterilization and cook-in process.

The total thickness of the laminate film may vary within wide limits. Preferably, the total thickness of the laminate film is at least 10 micron or at least 15 micron or at least 20 micron or at least 25 micron. Further, the total thickness of the laminate film preferably is at most 100 micron or at most 80 micron or at most 70 micron or at most 50 micron. The total thickness of the laminate film preferably ranges from 10 to 100 micron, in particular from 15 to 80 micron, preferably from 20 to 60 micron, even more preferably from 25 to 50 micron.

Preferably, the thickness ratio between the first and the second film of the present laminate film is from 2:1 to 0.5:1, preferably from 1.6:1 to 1:1

One or more of the layers of the film may contain any of the additives conventionally employed in the manufacture of polymeric films. Thus, agents such as pigments, lubricants, anti-oxidants, radical scavengers, UV absorbers, thermal stabilisers, anti-blocking agents, surface-active agents, slip aids, optical brighteners, gloss improvers, viscosity modifiers may be incorporated as appropriate.

In particular, to improve the processing of the film in high speed packaging equipment, slip and/or anti-blocking agents may be added to one or both of the surface layers. The additives may be added in the form of a concentrate in a polyester carrier resin. The amount of additive is typically in the order of 0.2 to 5% by weight of the total weight of the layer. Suitable slip and/or anti-blocking agent is SUKANO G dc S503 by Sukano.

A preferred laminate film according to the invention is a transparent laminate film comprising a first bi-axially oriented polyester film laminated to a second bi-axially oriented polyester film, wherein
  said first bi-axially oriented polyester film comprises a polyester base film, comprising at least one polyester layer comprising one or more co-polyester(s) comprising units of terephthalic acid and at least a diol,
  said second bi-axially oriented polyester film comprises a polyethylene terephthalate base film, an inorganic vapor deposited layer, and an optional outer protective layer directly adhered to said inorganic vapor deposited layer, said inorganic vapor deposited layer comprising an inorganic compound selected from the group consisting of oxides, nitrides and oxynitrides of Al, Ti, Si, Zn, Sn, and mixture thereof, and
  a glue layer is interposed between said first bi-axially oriented polyester film and the inorganic vapor deposited layer or the protective layer, if present, of said second bi-axially oriented polyester film, wherein the glue layer is made of a polyurethane adhesive derived from a base resin, selected from the group consisting of polyester polyols, polyurethane polyols, polycarbonate polyols, acrylic polyols, polyether polyols and polyolefin polyols, and a curing agent, selected from the group consisting of polyisocyanate compounds having two or more isocyanate groups in one molecule, and
  wherein said laminate film has
    a tear ratio, between the tear initiation force measured according to ASTM D-1004 and said laminate film total thickness, of at least 37 gf/micron in at least one of longitudinal and transverse direction, and
    a free shrink measured according to modified ISO11501-95 at 180° C. for 5 minutes lower than 5% in at least one of longitudinal and transverse direction.

A preferred laminate film according to the invention is a white or colored laminate film comprising a first bi-axially oriented polyester film laminated to a second bi-axially oriented polyester film, wherein
  said first bi-axially oriented polyester film comprises a polyester base film comprising at least one polyester layer comprising one or more co-polyester(s) comprising units of terephthalic acid and at least a diol,
  said second bi-axially oriented polyester film comprises a polyethylene terephthalate base film, an inorganic vapor deposited layer, and an optional outer protective layer directly adhered to said inorganic vapor deposited layer, said inorganic vapor deposited layer comprising an inorganic compound selected from the group consisting of oxides, nitrides and oxynitrides of Al, Ti, Si, Zn, Sn, and mixture thereof,
  a glue layer is interposed between said first bi-axially oriented polyester film and the inorganic vapor deposited layer or the protective layer, if present, of said second bi-axially oriented polyester film, wherein the glue layer is made of a polyurethane adhesive derived from a base resin, selected from the group consisting of polyester polyols, polyurethane polyols, polycarbonate polyols, acrylic polyols, polyether polyols and polyolefin polyols, and a curing agent, selected from the group consisting of polyisocyanate compounds having two or more isocyanate groups in one molecule, and
  an ink layer is interposed between said first bi-axially oriented polyester film and the glue layer and/or between the glue layer and said protective layer of said second bi-axially oriented polyester film, wherein said laminate film has
    a tear ratio, between the tear initiation force measured according to ASTM D-1004 and said laminate film total thickness, of at least 37 gf/micron in at least one of longitudinal and transverse direction, and
    a free shrink measured according to modified ISO11501-95 at 180° C. for 5 minutes lower than 5% in at least one of longitudinal and transverse direction.

In a preferred embodiment, the transparent laminate film consists of a first bi-axially oriented polyester film, a glue layer and a second bi-axially oriented polyester film, wherein
  the first bi-axially oriented polyester film consists of a first outer layer, a core layer and a second outer layer, wherein
  the first outer layer comprises an amorphous polyester, an ethylene-alpha-olefin copolymer, preferably an LLDPE, more preferably a modified LLDPE, in the range from 12 to 20% and a fluoropolymer containing LDPE in the range from 0.5 to 5% by weight based on the weight of the first layer;
  the core layer comprises at least 40% of poly(ethylene terephthalate) and not more than 60% of an amorphous polyester, based on the weight of the core layer, wherein the poly(ethylene terephthalate) has an IV of at least 0.75; and
  the second outer layer comprises poly(ethylene terephthalate) having an IV of at least 0.75 and an amorphous polyester;
  the second bi-axially oriented polyester film consist of a polyethylene terephthalate base film, an inorganic vapor deposited layer directly adhered to the polyethylene terephthalate base film and an outer protective layer directly adhered to the inorganic vapor deposited layer,
  the glue layer is interposed between the second outer layer of the first bi-axially oriented polyester film and the protective layer of the second bi-axially oriented polyester film and comprises a polyurethane adhesive.

In the above preferred embodiment, preferably the glue layer is made of a polyurethane adhesive derived from a base resin, selected from the group consisting of polyester polyols, polyurethane polyols, polycarbonate polyols, acrylic polyols, polyether polyols and polyolefin polyols, and a curing agent, selected from the group consisting of polyisocyanate compounds having two or more isocyanate groups in one molecule.

In a preferred embodiment, the white or coloured laminate film consists of a first bi-axially oriented polyester film, a glue layer and a second bi-axially oriented polyester film, wherein
  the first bi-axially oriented polyester film consists of a first outer layer, a core layer and a second outer layer, wherein
  the first outer layer comprises an amorphous polyester, an ethylene-alpha-olefin copolymer, preferably an LLDPE, more preferably a modified LLDPE, in the range from 12 to 20% and a fluoropolymer containing LDPE in the range from 0.5 to 5% by weight based on the weight of the first layer;

the core layer comprises at least 40% of poly(ethylene terephthalate) and not more than 60% of an amorphous polyester, based on the weight of the core layer, wherein the poly(ethylene terephthalate) has an IV of at least 0.75; and the second outer layer comprises poly(ethylene terephthalate having an IV of at least 0.75 and an amorphous polyester;

the second bi-axially oriented polyester film consists of a polyethylene terephthalate base film, an inorganic vapor deposited layer directly adhered to the polyethylene terephthalate base film, a protective layer directly adhered to the inorganic vapor deposited layer and an ink layer directly adhered to the protective layer;

the glue layer is interposed between the second outer layer of the first bi-axially oriented polyester film and the ink layer of the second bi-axially oriented polyester film and comprises a polyurethane adhesive.

In the above preferred embodiment, preferably the glue layer is made of a polyurethane adhesive derived from a base resin, selected from the group consisting of polyester polyols, polyurethane polyols, polycarbonate polyols, acrylic polyols, polyether polyols and polyolefin polyols, and a curing agent, selected from the group consisting of polyisocyanate compounds having two or more isocyanate groups in one molecule.

The present laminate polyester film is peelable, namely it is easily removed by pulling without tearing, when sealed over CPET, APET, APET/CPET containers.

The laminate polyester film may be manufactured according to a process that comprises:

providing a first bi-axially oriented polyester film which comprises a polyester base film comprising at least one polyester layer comprising one or more co-polyester(s) comprising units of terephthalic acid and at least a diol, providing a second bi-axially oriented polyester film which comprises a polyethylene terephthalate base film and an inorganic vapor deposited layer, said inorganic vapor deposited layer comprising an inorganic compound selected from the group consisting of oxides, nitrides and oxynitrides of Al, Ti, Si, Zn, Sn, and mixture thereof, glue laminating said first bi-axially oriented polyester film with said inorganic vapor deposited layer of the second bi-axially oriented polyester film.

The process may further optionally comprise a step of coating a protective layer directly adhered to said inorganic vapor deposited layer. Such a coating step is made before the lamination step.

Preferably, the process may further comprise an optional step of printing an ink layer on an outer surface—in case of more layers the non-sealant outer surface—of said at least one polyester layer of said first bi-axially oriented polyester film or an outer surface of said protective layer of said second bi-axially oriented polyester film. Such a printing step is made before the lamination step.

The present process may further optionally comprise a corona discharge treatment of the surfaces of either the first or second bi-axially oriented polyester film, or both. As common in the art, corona discharge treatment refers to subjecting the surfaces of a polymeric material, such as a polyester film, to corona discharge, i.e. the ionization of a gas such as air in close proximity to a film surface, the ionization initiated by a high voltage passed through a nearby electrode, and causing oxidation and other changes to the film surface. Either of two types of corona treatment may be employed. A bare electrode may be used in combination with an insulated roll, e.g. a rubber insulated roll. Alternatively, a glass electrode may be used in conjunction with a bare metal roll.

The optimum corona treatment level will depend on the kind, thickness and feed rate of the film to be corona treated. The conditions for corona discharge treatment are adjusted so that the treatment provides the surface of the layer with a wet tension strength of at least 30 dyne/cm (0.03 N/m), preferably at least 35 dyne/cm (0.035 N/m), more preferably at least 40 dyne/cm (0.04 N/m). The corona treatment energy level generally employed with the film is typically from about 150 to about 500 mA. However, lower or higher energy levels might also be suitably employed to provide the film surface with the desired wet tension strength.

The first bi-axially oriented polyester film may be manufactured according to the following steps a) co-extrusion of the film resins through a flat die, b) sequential or simultaneous bi-axial orientation of the obtained cast sheet, at an orientation ratio in the longitudinal direction higher than 2:1, preferably higher than 3:1 and at an orientation ratio in the cross-wise direction higher than 2:1, preferably higher than 3:1;

c) optionally annealing or heat-setting the oriented films respectively at temperatures of from 70 to 100° C. or from 130 to 210° C.;

d) cooling the film at a temperature in the range of 10 to 40° C.

The polyester base film can be manufactured according to conventional technique, for instance as described in EP2714390.

a) The manufacture of the present polyester base film involves feeding the extruders with the solid polymer or polymer blend beads for the various layers, melting the polymer beads in the extruders and then forward the molten resins of the layers into a flat extrusion die where they are combined to give the desired sequence. The obtained tape, that is preferably from about 0.1 mm to about 2 mm thick, is then cooled, for instance by means of a chill roll, typically with the aid of an air knife.

The cooled sheet is then optionally fed through an irradiation unit, typically comprising an irradiation vault surrounded by a shielding. The flat sheet may in fact be irradiated with high-energy electrons (i.e., ionizing radiation) from an iron core transformer accelerator. Irradiation is carried out to induce cross-linking. The flat sheet is preferably guided through the irradiation vault on rolls. It is thus possible by suitably combining the number of rolls and the path of the traveling web within the irradiation unit to get more than one exposure of the sheet to the ionizing radiation. In one embodiment, the sheet is irradiated to a level of from about 10 to about 200 kGy, preferably of from about 15 to about 150 kGy, and more preferably of from about 20 to about 120 kGy, wherein the most preferred amount of radiation is dependent upon the polymers employed and the film end use. While irradiation is preferably carried out on the extruded cast sheet just before orientation, as described above, it could also be carried out, alternatively or additionally, during or after orientation.

b) Orientation can be done by a simultaneous or sequential tenter apparatus, preferably a simultaneous tenter apparatus.

In the simultaneous process, the optionally irradiated tape is then fed to the pre-heating zone of a simultaneous tenter apparatus, with or without a prior passage through an IR heated oven. The temperature of the oven in said pre-heating zone, the length thereof and the time spent by the traveling web in said zone (i.e. the web speed) can suitably be varied in order to bring the sheet up to the desired temperature for bi-axial orientation. In a preferred embodiment, the orientation temperature is comprised between about 90° C. and about 140° C. and the temperature of the pre-heating zone is kept between about 90° C. and about 150° C. In said pre-heating zone, the sheet is clipped but it is not yet stretched. Thereafter, the resulting hot, optionally irradiated, and clipped sheet is directed to the stretching zone of the simultaneous tenter. Any simultaneous stretching means can be used in said zone. Preferably, however the clips are propelled throughout the opposed loops of the tenter frame by means of a linear synchronous motor. A suitable line for simultaneous stretching with linear motor technology has been designed by Bruckner GmbH and advertised as LISIM® line.

An alternative line for simultaneous stretching of the extruded flat tape is the Andritz MESIM® line, a mechanical system based on a pantograph, equipped with two separated monorails on each side of the orientation unit which determines—by diverging—the pantograph opening. Simultaneous Tenterframe technologies such as the "fixed pantograph" and the "spindle" technologies may also be used.

The configuration of the tenter can be varied depending on the stretching ratios desired. The stretching ratios that are applied in the process are generally comprised between about 2:1 and about 5:1 for MD stretching and between about 2:1 and about 5:1 for TD stretching. Preferably, however stretching ratios higher than 2.5:1 in both directions are applied, wherein stretching ratios higher than 3:1 in both directions are more preferred. The temperature in the stretching zone is kept close to the selected orientation temperature T.

The stretched film is then transferred in a zone that, depending on whether a heat-shrinkable or non heat-shrinkable film is desired, may be a relaxation/annealing or heat-setting zone, heated to a temperature of about 70-100° C. or 130-210° C. respectively.

In the sequential orientation process, the optionally irradiated tape is firstly oriented in one direction, usually the longitudinal direction, i.e. the forward direction through the film stretching machine, and then in the transverse direction. Longitudinal stretching of the extrudate is conveniently carried out over a set of rotating rolls (MDO), which rotate at different speeds. At least one of the first pairs of rolls is heated, for example by inner circulation of hot oil. Transverse stretching is usually carried out in a tenter apparatus (TDO), which comprises a certain number of heating zones and suitable stretching means.

To produce the multilayer biaxially oriented base film, the polymers for the base layer, for the heat-sealable outer layer and, where appropriate, for the second outer layer are fed to separate extruders. The melts are extruded through a multilayer T-die and quenched over a chill roll. Longitudinal stretching (MDO) of the extrudate is conveniently carried out at a temperature range from 60 to 120° C., preferably 70 to 100° C.

In the transverse stretching (TDO), the temperatures of the film are in the range from 90° C. (preheating zone) to 130° C. (stretching zone), preferably 90° C. (preheating zone) to 110° C. (stretching zone).

The longitudinal stretching ratio is in the range from 2.0:1 to 5.0:1, preferably from 2.3:1 to 4.8:1. The transverse stretching ratio is generally in the range from 2.4:1 to 5.0:1, preferably from 2.6:1 to 4.5:1. Annealing or heat-setting is carried out at a temperature of from 70 to 100° C. or from 130 to 210° C., the temperature depending on the desired shrink.

Following the annealing or heat-setting step, the film is transferred to a cooling zone where generally air, either cooled or kept at the ambient temperature, is employed to cool down the film. The temperature of said cooling zone is therefore typically comprised between about 20 and about 40° C. At the end of the line, the edges of the film, that were grasped by the clips and have not been oriented, are trimmed off and the obtained bi-axially oriented, heat-shrinkable or heat-set film is then wound up, with or without prior slitting of the film web to the suitable width. Subsequently, the film is wound up in a customary manner.

To allow recycling of the trimmed edges, or at least of part thereof, a multi-manifold die may preferably be employed in the co-extrusion so that the edges of the extruded tape that will be grasped by the clips are of a single polymer or polymer composition, typically, in the present process, the polymer(s) of the first outer layer.

The films thus obtained advantageously have a thickness variation of less than 10 percent, preferably less than 8 percent, and more preferably less than 5 percent.

Usually the polyester base films, if manufactured according to the present description, show a tear ratio higher than 37 gf/micron.

The Applicant has realized that tear initiation properties of the first bi-axially oriented polyester film are decisive in obtaining an easy opening of the package and that they are unexpectedly maintained in the corresponding laminate films for use in the packages of the invention.

Without being bound to any theory, the Applicant assumes that the relevance of the tear properties of the first film is due to the fact that, at the opening of the package, just this film in the laminate is the one most subjected to the effect of contrasting forces: on the one hand, the strength of the seal and, on the other hand, that of the user pulling the lid.

Accordingly, the skilled person guided by the present description can manufacture and select suitable first polyester films before lamination by discarding those that do not comply because of too low values of tear ratios. In this way, it is possible to manufacture the laminate film with the appropriate tear to allow a soft opening of the package without tearing the lid.

The films thus obtained may then be subjected to a corona discharge treatment to improve the print receptivity characteristics of the film surface. Preferably, however, the base films are not corona treated.

The second bi-axially oriented polyester film may be manufactured according to method known in the art, such as, for example, according to the teaching of US Patent Publication No. 2016/009942, 2016/265111, and 2016/017491. The second bi-axially oriented polyester films useful for the laminate film are also commercially available from Toppan USA, Inc. under the tradename GL Barrier Film, such as for example, GL-ARH Barrier Film.

The ink layer is generally obtained with a solvent-based ink that cures by evaporation of a solvent rather than by chemical reaction. Alternatively, the ink layer can be obtained by a reactive ink system which is radiation-curable or thermosetting. Generally, the ink layer thickness is between 0.5 and 5 µm, preferably between 0.5 and 1.5 µm. The ink layer is preferably applied to the second bi-axially oriented polyester film. However, the ink layer may be applied only to the first biaxially oriented polyester film or to both the first and the second biaxially oriented polyester films.

One or more layers of ink can be printed onto the second bi-axially oriented polyester film. In the laminate film, the ink layer is preferably applied to the optional protective layer covering the inorganic vapor deposited layer.

Methods for printing the second bi-axially oriented polyester film include any conventional method of printing of plastic materials well known in the art. Inks that can be used in the printing process include polyurethane ink, as well as other types of ink based on polyvinyl butyral (PVB), polyamide and polyurethane when converting or using processes involving temperatures higher than 95-100° C., i.e., sterilization.

The glue lamination of the first bi-axially oriented polyester film with the second bi-axially oriented polyester film is made using conventional techniques. Glue lamination could be solvent-less or solvent based as well known in the art. Generally, the glue layer thickness is between 1 and 5 µm, preferably 3 and 5 µm. The glue layer is preferably applied on the second bi-axially oriented polyester film, to the surface of the vapor deposited layer or, preferably to the surface of the ink layer covering the protective layer, but can also be applied on the first bi-axially oriented polyester film. The material for serving as a base material of the glue layer is preferably a polyurethane adhesive derived from a base resin and a curing agent as principal components. Materials that can be used for the resin compound include, but are not limited to, polyester polyols, polyurethane polyols, polycarbonate polyols, acrylic polyols, polyether polyols, polyolefin polyols, and the like. The curing agent can be materials containing a polyisocyanate compound having two or more isocyanate groups in one molecule.

An object of the present invention is a package comprising a container, a product and a lid made of the laminate film described above sealed onto said container.

In a preferred embodiment of the present package, the first bi-axially oriented polyester film of said laminate film comprises a first outer layer comprising:
from 10 to 25% by weight of an ethylene-alpha-olefin copolymer, more preferably an LLDPE, even more preferably a modified LLDPE,
from 20% to 60% by weight of poly(ethylene terephthalate), preferably having an IV of at least 0.75, and
from 25% to 70% by weight of an amorphous polyester, based on the weight of the first outer layer.

In a preferred embodiment of the present package, the first bi-axially oriented polyester film of said laminate film comprises a first outer layer comprising:
from 12 to 20% by weight of an ethylene-alpha-olefin copolymer, more preferably an LLDPE, even more preferably a modified LLDPE,
from 20% to 30% by weight of poly(ethylene terephthalate), preferably having an IV of at least 0.75, and
from 55% to 65% by weight of an amorphous polyester, based on the weight of the first outer layer.

Typically, the surface of the container in contact with the product, i.e. the surface involved in the formation of the seal with the lidding film, comprises a polyester resin, usually an amorphous polyester resin (APET). For instance, the container can be made of cardboard coated with polyester or it can be integrally made of a polyester resin. Examples of suitable containers for the package of the invention are CPET, APET, APET/CPET, either foamed or not foamed, i.e. solid. APET/CPET tray are known in the art as CPET trays with a surface layer of APET for promoting sealing of the lidding film.

Advantageously, the lidded package of the present invention may be easily opened by pulling the lid, without tearing it, even in case the package were subjected to pasteurization or sterilization treatments. A further object of the present invention is a process for manufacturing a package according to the invention.

The package is produced by techniques well-known to those skilled in the art. Once the food to be packaged has been introduced into the container, the laminate film is sealed to the container by means of temperature and/or pressure using conventional techniques and equipment. The laminate film is placed on the container such that the first bi-axially oriented polyester film is in contact with the surface of the container. Sealing is carried out by means of a heated frame at temperatures of from 100° C. to 200° C., from 120° C. to 200° C., from 140° C. to 200° C., from 160° C. to 200° C. at a pressure of 2 to 10 bar, 4 to 8 bar.

Preferably, sealing is carried out at temperatures from 160° C. to 200° C. at a pressure of 4 to 8 bar. Sealing times are typically in the order of 0.3 to 2.0 seconds, 0.5 to 1.0 seconds.

Typical equipment used for the manufacture of the present tray lidding packages includes, for instance, Proseal GTO Tooling 1218 OC, Multivac 400 and Multivac T550 by Multivac Sep. GmbH, Mondini Trave, E380, E390 or E590 by Mondini S.p.A., Ross A20 or Ross S45 by Ross-Reiser, Mecaplastic 1000, Meca-2002 or Meca-2003 by Mecaplastic, Sealpac tray lidding machines and the like.

The package so obtained is preferably characterized by a seal strength from about 350 to about 750 gf, more preferably from about 450 to about 650 gf measured according to the test described in the present experimental section.

The package is suitable for use with shelf stable ready-prepared foods, so-called "ready-meals", which are subjected to a pasteurization or sterilization treatment before distribution and are intended to be warmed in a microwave oven or in any other type of oven, such as a conventional convection oven, a direct radiation oven and a forced hot air oven (dual ovenable package).

In alternative, preferably packaged food may be pet food (i.e. food for animals) or baby food (i.e. food for infants).

A further object of the present invention is the use of the laminate film described above for packaging food in tray lidding applications, preferably in tray lidding cook-in applications, such as for instance in tray lidding packaging of shelf stable ready meals.

A further object of the present invention is a transparent or white or coloured laminate film as described above, for use as a lid in tray lidding, characterized in that the glue layer is made of a polyurethane adhesive derived from a base resin, selected from the group consisting of polyester polyols, polyurethane polyols, polycarbonate polyols, acrylic polyols, polyether polyols and polyolefin polyols, and a curing agent, selected from the group consisting of polyisocyanate compounds having two or more isocyanate groups in one molecule.

The present laminate film is particularly advantageous, as it remains integer at opening even after the demanding sterilization step and the final re-heating before food consumption.

Furthermore, the polyurethane adhesive selected for the glue layer does not impair the barrier properties of the second bi-axially oriented polyester film.

EXAMPLES

The present invention can be further understood by reference to the following examples that are merely illustrative and are not to be interpreted as a limitation to the scope of the present invention that is defined by the appended claims.

Example 1—Materials

In the following examples, the polymers and coatings indicated in Table 1 below have been employed.

TABLE 1

| Tradename/Supplier | Chemical Nature | Acronym | Properties & Parameters |
|---|---|---|---|
| GN001-Eastman Chemical | Polyethylene Terephthalate/Glycol | PETG1 | Density 1.27 g/cm$^3$, Glass Transition 78° C., Viscosity Intrisic 0.75 dl/g |
| SUKANO G dc S503-Sukano | AntiBlock and Slip in Polyethylene Terephthalate/Glycol-Amorphous Silica and Ester Wax | PETG2 | Additives (SiO2) 10%, Additives (Wax) 6%, Bulk (Apparent) Density 1.2 g/cm$^3$, Vicat Softening Point 82° C. |
| BYNEL 4104 (2006)-DuPont | Maleic Anhydride-Modified Ethylene/Butene Copolymer | LLDPE-mod1 | Density 0.92 g/cm$^3$, Melt Flow Rate (Cond. 190° C./02.16 kg (E)) 1.10 g/10 min, Melting point 125° C. |
| RAMAPET N180, Indorama | Polyester, copolymer of terephthalic acid, isophthalic acid and mono-ethylene glycol | PET1 | Density 1.4 g/cm$^3$, Intrinsic Viscosity 0.80 dl/g, Glass transition temperature 78° C., Melting point 245° C. |
| TECHBARRIER TX, Mitsuibishi Plastics | Polyester, Biaxially Oriented-Silicon Oxide Coated | Film 3 (PET2) | Density 1.4 g/cm3, Surface Energy 44 dynes/cm, Thickness (Total) 12 micron |
| Ceramis CPT018, AMCOR Flexibles | Polyester, Biaxially Oriented-Pigmented | Film 4 | Density 1.45 g/cm3, Thickness (Total) 12 micron |
| Polurflex 2645, SAPICI | Solvent Based, Polyurethane Polyol-Polyester Coreactant | PU2 | Volatile Content (HydrolyzableChloride) 40% |
| Polurflex 5808, SAPICI | Solvent Based, Polyurethane Isocyanate-Aliphatic Isocyanate | PU3 | Volatile Content (HydrolyzableChloride) 75% |
| ETHYL ACETATE, Brenntag | Ethyl Acetate | EtAc | Acidity (Acetic Acid) Max. 0.005%, Boiling Point about 80° C., Color Max 5, Density 0.8990 g/cm3, Moisture Content Max 0.03%, Purity Min. 95% |
| White ink SAC LID PU LAM, white pigment 907922269/528/FJ04 G, Sun Chemical | White Ink, Solvent Based-Polyurethane | INK1 | Viscosity 25 mPa · sec |
| CESA-PROCESS PEA0050633-BN-Clariant | Fluoropolymer in Low Density Polyethylene | LDPE1 | Bulk (Apparent) Density 0.5 0.6 g/cm$^{3,}$ Density 0.92 g/cm$^{3,}$ Melt Flow Rate (190° C./2.16 kg). 2.1 g/10 min |

Example 2—Film Description

Four different films A to D were prepared and evaluated for their peeling and barrier properties.

The laminate film A according to the invention was prepared by laminating the first bi-axially oriented polyester film 1 to a second bi-axially oriented polyester film 2 as described below.

Film 1: 3 layers film (sealant, base and outer)

| Sealant | Base | Outer (glue-laminated to Film 2) |
|---|---|---|
| 58% PETG1<br>16% LLDPE-mod1<br>24% PET1<br>2% LDPE1<br>(2.0 micron) | 60% PET1<br>40% PETG1<br>(12.0 micron) | 98% PET1<br>2% PETG2<br>(3.5 micron) |

Film 2

Film 2 is a transparent barrier layer comprising a 12 μm thick bi-axially oriented PET film coated with a 40 nanometers thick AlOx layer and a 0.5 μm thick protective layer supplied by Toppan under the trade name GL-ARH. The surface of the protective layer was coated with a 1 μm thick ink layer obtained by coating INK1 and then evaporating the solvent.

Before lamination with Film 1, the ink layer was coated with a 4 μm thick glue layer obtained by coating a glue composition containing PU2 (45.50 wt %), PU3 (9.00 wt %) and EtAc (45.50 wt %) and then evaporating the solvent.

The comparative high barrier peelable laminate film B was a commercial film supplied by Scanfresh under the trade name Top 29 fresh film having the following structure.

| Layer 5 | Layer 4 | Layer 3 | Layer 2 | Layer 1 |
|---|---|---|---|---|
| PET Base Layer (12 μm) | Adhesive Layer (2 μm) | Aluminium Layer (9 μm) | Adhesive layer (2 μm) | PET Peelable sealant Layer (25 μm) |

The comparative high barrier peelable laminate film C was prepared by laminating the first bi-axially oriented polyester Film 1 as previously described to a second bi-axially oriented polyester Film 3 as described below.

Film 3 was a commercial film supplied by Mitsubishi Plastics under the trade name Techbarrier TX.

Film 3 is a transparent biaxially oriented PET based film coated with a SiOx layer having total thickness of 12 μm, density 1.4 g/cm$^3$, and surface energy 44 dyne/cm.

Before lamination with Film 1, Film 3 was first printed with a 1 μm thick ink layer obtained by coating INK1 and evaporating the solvent, and then coated with a 4 μm thick glue layer obtained by coating a glue composition containing PU2 (45.50 wt %), PU3 (9.00 wt %), and EtAc (45.50 wt %) and evaporating the solvent.

The comparative high barrier peelable laminate film D was prepared by laminating the first bi-axially oriented polyester Film 1 as previously described to a second bi-axially oriented polyester Film 4 as described below.

Film 4 was a commercial film supplied by AMCOR Flexibles under the trade name Ceramis CPT018.

Film 4 is a white pigmented biaxially oriented PET based film having an inorganic layer of SiOx, a total thickness of 12 μm and density 1.45 g/cm$^3$.

Before lamination with Film 1, Film 4 was coated with a 4 μm thick glue layer obtained by coating a glue composition containing PU2 (45.5 wt %), PU3 (9.0 wt %), and EtAc (45.5 wt %) and then evaporating the solvent.

Example 3—Tests and Methods

Film A and Film B were sealed (170° C., 1 sec, Proseal GTO packaging machine) on a rectangular Black CPET 2155-1E tray supplied by Faerch, suitable for autoclaving up to 135° C. and with temperature range from −40° C. to +220° C. The tray had dimensions 155.5×127.2×49.7 mm and was filled with about 350 g of baked beans.

The resulting packages were subjected to sterilization (123° C., 30', 2.10 bar) and regeneration in conventional oven (180° C., 1 h) and microwave (5 minutes, 900 W).

The packages were visually inspected for appearance and manually opened by two panellists. The tray were not distorted after the sterilization and regeneration treatment, and the packages were tight. Film A was always peelable in one piece, without rip or delamination at opening and in all the conditions tested. Film B on the contrary showed delamination at opening between layer 3 and layer 2 in all the tested conditions.

Table 2 reports the testing methods used for the characterization of the films A, C and D, and of the packages thus obtained.

TABLE 2

Test methods.

| Property | Test method |
|---|---|
| Free shrink | ISO 11501-95, modified as described below |
| Tear initiation force | ASTM D-1004 |
| Shrink tension 200° C. | Internal method see description below |
| Hermeticity | Internal method see description below; burst test according to ASTM F-1140 |
| Seal strength | Internal method see description below |
| Oxygen permeability | ASTM D-3985 |

Free Shrink

Figure 2:
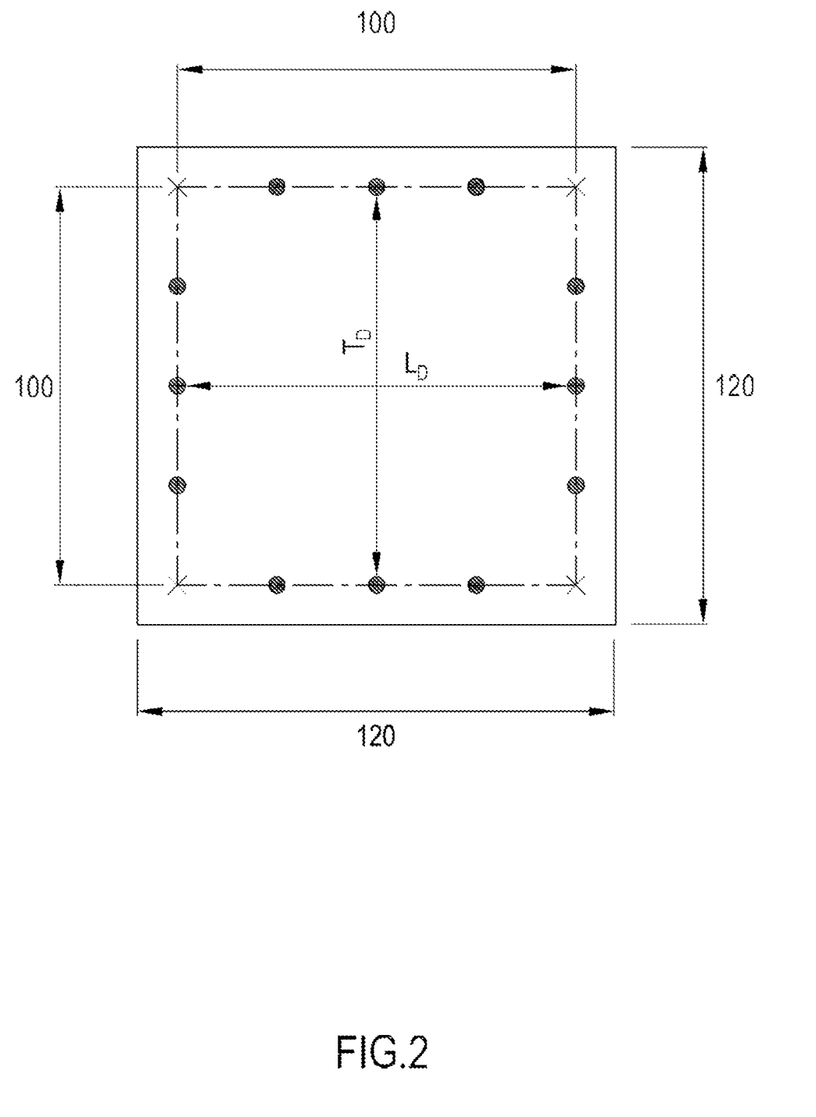
FIG. 2 show a sample employed to measure the free shrink according to the test method described in the experimental part.

Free shrink of laminate film A has been tested in a circulating air oven at 180° C. per 5 minutes, following ISO11501-95 (herein incorporated in its entirety) with the following modifications:

instead of using kaolin bed, in order to avoid sticking of the film onto the metal bed, a small quantity of a powdered corn starch C300R by Arkem PRS has been spread onto both sides of the film and the film has been then put unconstrained (free) between two paper foils;

the sandwich thus obtained has been positioned onto the metal plate of the oven for the test;

the samples to be tested have been conditioned for 24 hours at 23° C. and 50% RH;

the temperature has been controlled through the temperature sensor of the oven and, before testing, the oven has been kept at 180° C. for 1 hour;

the measurement after oven were taken as shown in FIG. 2 with the black dots at centre and middle lines of the marked square such that 6 measurement in LD and 6 measurement in TD have been taken for each specimen; the measurement in longitudinal and transverse direction were taken to the nearest 1.0 mm;

the average of the measurement in LD and TD for each specimens have been used to calculate the average LD and TD value of each film.

The results are illustrated in Table 3.

Tear Initiation Force

Tear initiation force of laminate film A has been evaluated and has the meaning according to ASTM D-1004. The tear initiation at 45° was measured by following the same ASTM D-1004, but using a specimen cut direction oriented with an angle of 45° with respect to both the longitudinal and transverse directions. The results are illustrated in Table 3.

Shrink Tension 200° C.

The maximum shrink tension is the maximum value of the tension developed by the materials during the heating/shrinking process. Specimens of laminate film A (2.54 cm×14.0 cm, of which 10 cm are free for testing) are cut in the longitudinal (LD) and transverse (TD) directions of the film and clamped between two jaws, one of which is connected to a load cell. The two jaws keep the specimen in the centre of a channel into which an impeller blows heated or cold air and two thermocouples measure the temperature. The thermocouples are positioned as close as possible (less than 3 mm) to the specimen and in the middle of the same. The signals supplied by the thermocouples (which is the testing temperature) and by the load cell (which is the force) are sent to a computer where the software records these signals. The impeller starts blowing hot air and the force released by the sample is recorded in grams. The temperature is increased from 23° C. to 200° C. at a rate of about 3.2° C./second by blowing heated air. The shrink tension is calculated by dividing the maximum force value in kg (force at peak) by the specimen width (expressed in cm) and by the specimen average thickness (expressed in cm) and is expressed as kg/cm$^2$. The residual cold shrink tension is calculated by dividing the force (in kg) exerted by the specimen at 5° C. and the specimen width (in cm) and the specimen average thickness (in cm) and is expressed as kg/cm$^2$. Three specimens were measured for each film in each direction. The results for film A are illustrated in Table 3.

TABLE 3

| | Tear Initiation (gf) | Tear ratio (gf/μm) | Free shrink (%) | Shrink tension 200° C. (kg/cm$^2$) |
|---|---|---|---|---|
| LD | 1,600 | 47 | 2 | 24.0 |
| TD | 1,710 | 50 | 1 | 9.2 |
| 45° | 1,340 | 39 | nd | nd | nd: not determined

Hermeticity (Burst Test)

The packages were manufactured on a Proseal GTO machine by sealing the laminate film A according to the invention at 170° C. for 1 sec on a Black CPET 2155-1E tray supplied by Faerch, tray (dimensions 155.5×127.2×49.7 mm). The seals were "clean", i.e. the film were sealed onto the tray keeping the tray flange under clean (i.e. non-contaminated) conditions. No product was packaged.

Hermeticity of the seals of the packages was evaluated through a "burst test" by using Lippke 4500 instrument supplied by DanSensor. This test was performed according to the standard method of ASTM F-1140.

Each package was placed on the flat surface of the stand. A sept was positioned onto the lidding film in the centre of the lidding film. A needle was introduced into the sept and then into the package by perforating the lidding film. After a pre-filling of 10 mbar, air was inflated through the needle into the package at a pressure rate of 25 mbar/sec until the burst. The instrument software recorded the inflation curve until the maximum pressure reached before the burst occurred.

Table 4 reports the average burst value (mbar) for each film, resulting from the burst pressure values of 10 packages, under accelerated aging at 60° C. up to 24 months. The aging accelerated test has been conducted according to ASTM F 1980-02 (in a circulating air oven at 60° C., an Arrhenius reaction rate Q10 of 2 was selected, accelerating aging factor was 13, therefore 28 days were equivalent to 12 months).

Seal Strength

Figure 1:
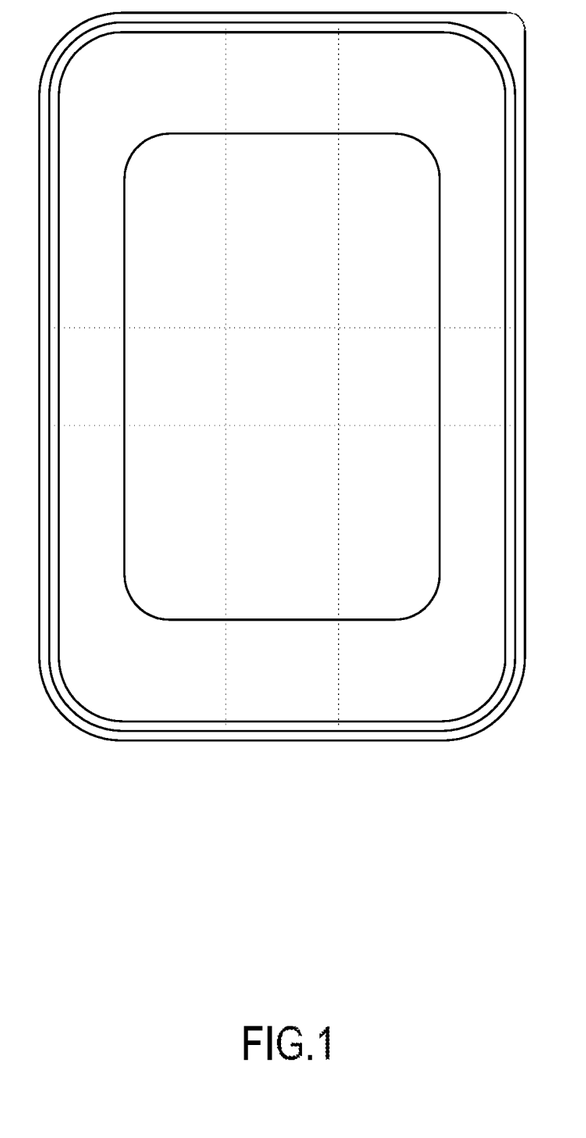
FIG. 1 shows a tray-lidding package from whom four specimens are cut off in order to measure the seal strength according to the test method described in the experimental part.

An internal test method was used to evaluate this property. The laminate film A according to the invention was sealed at 170° C. for 1 sec on a Black CPET 2155-1E tray supplied by Faerch, tray (dimensions 155.5×127.2×49.7 mm) on Proseal GTO machine. The seal strength was measured on 3 trays after sterilization (123° C., 30', 2.10 bar) and accelerated aging at 60° C. up to 24 months. The aging accelerated test has been conducted according to ASTM F 1980-02 (in a circulating air oven at 60° C., an Arrhenius reaction rate Q10 of 2 was selected, accelerating aging factor was 13, therefore 28 days were equivalent to 12 months). From each tray, 4 specimens were cut. A total of 12 specimens were then tested for each sealing conditions. The specimens were cut out from each package by using the following procedure:
- two parallel lines 25.4 mm (1 inch) apart from each other were drawn at the centre of the 4 sides as illustrated in FIG. 1;
- the film was cut following the drawn lines starting from the short side and continuing cutting on the long side;
- the tray was then cut following the marks thus obtaining four specimens 25.4 mm wide where the film was still attached to the tray flange.

The seal strength measurement was performed with a dynamometer at a crosshead speed of 300 mm/min and setting up an initial jaw separation of 20 mm. The specimen was clamped in the jaws (the film was clamped in the upper jaw which is movable during the test and the tray on the lower jaw which is fixed) in such a way that the seal is horizontally positioned at equal distance from the two jaws. The test was then started, the crosshead moved up until the seal was broken. The instrument recorded the force needed to open the seal in grams force (gf). The average values were reported in Table 4.

Oxygen Permeability

Oxygen permeability of laminate film A was evaluated according to ASTM D-3985 at 0% of relative humidity (RH) and 23° C. on plain material (i.e. on the film unwound flat from the roll, before any packaging and heat treatment process) and on film specimens that have been cut out from packages (such packages have been prepared as described above in relation to the seal strength method and sterilized at 123° C., for 30', at 2.10 bar). The packages were subjected to an aging accelerated test according to ASTM F 1980-02 (in a circulating air oven at 60° C., an Arrhenius reaction rate Q10 of 2 was selected, accelerating aging factor was 13, therefor 28 days were equivalent to 12 months). Two specimens were tested, the average results were reported in Table 4.

TABLE 4

| Time of measurement in the accelerated aging protocol | Burst test (mbar) | Seal strength (gf) | Oxygen permeability | |
|---|---|---|---|---|
| | | | Plain material | Package |
| T0 | 56.5 | 627 | 0.3 | 0.5 |
| T1 (3 months) | nd | 597 | 0.4 | 0.6 |
| T2 (6 months) | nd | 589 | 0.5 | 0.8 |
| T3 (9 months) | nd | 582 | 0.3 | 0.5 |
| T4 (12 months) | 65.7 | 586 | 0.4 | 0.6 |
| T5 (15 months) | nd | 583 | nd | 0.7 |
| T6 (18 months) | nd | 612 | nd | 0.5 |
| T7 (21 months) | nd | 609 | nd | 0.6 |
| T8 (24 months) | 65.6 | 596 | nd | 0.6 | nd: not determined

In the burst test, the packages subjected to accelerated aging (T4 and T8) showed better results than the untreated packages (T0). Oxygen permeability was conforming both on plain material and after sterilization.

The results of seal strength did not substantially change during accelerated aging according to ASTM F 1980-02 and were conforming to the specifications. The data of oxygen permeability were conforming to the specifications (lower than 1 cm³/m²) at all accelerated aging times.

The oxygen permeability of Films C and D was also evaluated according to ASTM D-3985 at 0% of relative humidity (RH) and 23° C. on plain material and on package subjected to sterilization (123° C., 30', 2.10 bar). Two specimens were tested for each film, the average results were reported in Table 5. The packages were manufactured on a Proseal GTO machine by sealing the Films C and D at 170° C. for 1 sec on a Black CPET 2155-1E tray supplied by Faerch, tray (dimensions 155.5×127.2×49.7 mm). The seals were "clean", i.e. the film were sealed onto the tray keeping the tray flange under clean (i.e. non-contaminated) conditions. No product was packaged.

TABLE 5

| FILM | Oxygen permeability | |
|---|---|---|
| | Plain material | Package |
| C | 1.55 | nd |
| D | 1.12 | 4.7 | nd: not determined

When an ink layer was coated to obtain comparative film C (white) the oxygen permeability increased to the unacceptable value higher than 1 cc/m²/day. Comparative film D, manufactured with a commercial white pigmented biaxially oriented PET based film, showed an oxygen permeability value slightly higher than 1 cc/m²/day, which dramatically increased after sterilization treatment.

The invention claimed is:

1. A dual ovenable package comprising a container, a product and a lid sealed onto said container, wherein the lid is a laminate film, which is either a transparent laminate film comprising a first bi-axially oriented polyester film laminated to a second bi-axially oriented polyester film, wherein
said first bi-axially oriented polyester film comprises a polyester base film, comprising at least one polyester layer comprising one or more co-polyester(s) comprising units of terephthalic acid and at least a diol,
said second bi-axially oriented polyester film comprises a polyethylene terephthalate base film, an inorganic vapor deposited layer and an optional outer protective layer directly adhered to said inorganic vapor deposited layer, said inorganic vapor deposited layer comprising an inorganic compound selected from the group consisting of oxides, nitrides and oxynitrides of Al, Ti, Si, Zn, Sn, and mixture thereof, and wherein
a glue layer is interposed between said first bi-axially oriented polyester film and the inorganic vapor deposited layer or the protective layer, if present, of said second bi-axially oriented polyester film,
or
a white or colored laminate film comprising a first bi-axially oriented polyester film laminated to a second bi-axially oriented polyester film, wherein
said first bi-axially oriented polyester film comprises a polyester base film comprising at least one polyester layer comprising one or more co-polyester(s) comprising units of terephthalic acid and at least a diol,
said second bi-axially oriented polyester film comprises a polyethylene terephthalate base film, an inorganic vapor deposited layer, and an optional outer protective layer directly adhered to said inorganic vapor deposited layer, said inorganic vapor deposited layer comprising an inorganic compound selected from the group consisting of oxides, nitrides and oxynitrides of Al, Ti, Si, Zn, Sn, and mixture thereof, and wherein
a glue layer is interposed between said first bi-axially oriented polyester film and the inorganic vapor deposited layer or the protective layer, if present, of said second bi-axially oriented polyester film, and
an ink layer is interposed between said first bi-axially oriented polyester film and the glue layer and/or between the glue layer and said protective layer of said second bi-axially oriented polyester film,
wherein said laminate film has
a tear ratio, between the tear initiation force measured according to ASTM D-1004 and the total thickness of the laminate film, of at least 37 gf/micron in at least one of longitudinal and transverse direction, and
a free shrink measured according to modified ISO11501-95 at 180° C. for 5 minutes lower than 5% in at least one of longitudinal and transverse direction.

2. The package according to claim 1 wherein said laminate film has a tear ratio of at least 39 gf/micron in at least one of longitudinal and transverse directions.

3. The package according to claim 1 wherein said laminate film has a free shrink lower than 4% in at least one of longitudinal and transverse directions.

4. The package according to claim 1 wherein the total thickness of said laminate film is from 10 to 100 micron.

5. The package according to claim 1 wherein the thickness ratio between the first and the second film of said laminate film is from 2:1 to 0.5:1.

6. The package according to claim 1 wherein said laminate film has an oxygen permeability, when measured under ASTM D3985 at 23° C. and 0% RH, lower than 2 cc/m²/day.

7. The package according to claim 1 wherein said polyester base film of said laminate film comprises at least 40% by weight of a poly(ethylene terephthalate) having an intrinsic viscosity (IV) of at least 0.75 dl/g, and not more than 60% by weight of an amorphous polyester resin.

8. The package according to claim 1 wherein the first bi-axially oriented polyester film of said laminate film comprises a first outer layer comprising:
from 10 to 25% by weight of an ethylene-alpha-olefin copolymer,
from 20% to 60% by weight of poly(ethylene terephthalate), and
from 25% to 70% by weight of an amorphous polyester, based on the weight of the first outer layer.

9. The package according to claim 1 wherein said second bi-axially oriented polyester film of said laminate film has a water vapor transmission rate, when measured under ASTM F1249 at 40° C. and 90% RH, lower than 5 g/m²/day.

10. The package according to claim 1 wherein said ink layer of said laminate film is interposed between said first bi-axially oriented polyester film and said glue layer.

11. The package according to claim 1 wherein the ink layer of said laminate film is interposed between the glue layer and the protective layer of the second bi-axially oriented polyester film.

12. The package according to claim 1 wherein the glue layer of said laminate film comprises a polyurethane adhesive derived from a base resin selected from the group consisting of polyester polyols, polyurethane polyols, polycarbonate polyols, acrylic polyols, polyether polyols, and polyolefin polyols, and a curing agent comprising a polyisocyanate compounds having two or more isocyanate groups in one molecule.

13. The package according to claim 1 wherein the strength of the seal between the container and the lid is from 350 to 750 gf measured according to the Seal Strength Test Method reported in the description.

14. The package according to claim 1 wherein the product is a food product.

15. The package according to claim 1 wherein said container is foamed or not foamed, and is selected from CPET, APET, and APET/CPET.

16. A process for manufacturing a package comprising the steps of
providing a foamed or not foamed container selected from CPET, APET, APET/CPET, a product and a lid, the lid is a laminate film, which is either;
a transparent laminate film comprising a first bi-axially oriented polyester film laminated to a second bi-axially oriented polyester film, wherein
said first bi-axially oriented polyester film comprises a polyester base film, comprising at least one polyester layer comprising one or more co-polyester(s) comprising units of terephthalic acid and at least a diol,
said second bi-axially oriented polyester film comprises a polyethylene terephthalate base film, an inorganic vapor deposited layer and an optional outer protective layer directly adhered to said inorganic vapor deposited layer, said inorganic vapor deposited layer comprising an inorganic compound selected from the group consisting of oxides, nitrides and oxynitrides of Al, Ti, Si, Zn, Sn, and mixture thereof, and wherein a glue layer is interposed between said first bi-axially oriented polyester film and the inorganic vapor deposited layer or the protective layer, if present, of said second bi-axially oriented polyester film, or a white or colored laminate film comprising a first bi-axially oriented polyester film laminated to a second bi-axially oriented polyester film, wherein said first bi-axially oriented polyester film comprises a polyester base film comprising at least one polyester layer comprising one or more co-polyester(s) comprising units of terephthalic acid and at least a diol, said second bi-axially oriented polyester film comprises a polyethylene terephthalate base film, an inorganic vapor deposited layer, and an optional outer protective layer directly adhered to said inorganic vapor deposited layer, said inorganic vapor deposited layer comprising an inorganic compound selected from the group consisting of oxides, nitrides and oxynitrides of Al, Ti, Si, Zn, Sn, and mixture thereof, and wherein a glue layer is interposed between said first bi-axially oriented polyester film and the inorganic vapor deposited layer or the protective layer, if present, of said second bi-axially oriented polyester film, and an ink layer is interposed between said first bi-axially oriented polyester film and the glue layer and/or between the glue layer and said protective layer of said second bi-axially oriented polyester film, wherein said laminate film has a tear ratio, between the tear initiation force measured according to ASTM D-1004 and the total thickness of the laminate film, of at least 37 gf/micron in at least one of longitudinal and transverse direction, and a free shrink measured according to modified ISO11501-95 at 180° C. for 5 minutes lower than 5% in at least one of longitudinal and transverse direction, introducing the product into the container, contacting the surface of the container with the first bi-axially oriented polyester film of said laminate film, and sealing the package by means of a heated frame at temperatures of from 100° C. to 200° C. at a pressure of 2 to 10 bar, in a time ranging from 0.3 to 2.0 seconds.

17. The process of claim 16 wherein the package is a tray lidding package comprising a packaged food therein.

18. The process of claim 17 wherein the packaged food is selected among ready meals, pet food and baby food.

19. A laminate film for use as a lid in tray lidding where the laminate film is either:

a transparent laminate film comprising a first bi-axially oriented polyester film laminated to a second bi-axially oriented polyester film, wherein said first bi-axially oriented polyester film comprises a polyester base film, comprising at least one polyester layer comprising one or more co-polyester(s) comprising units of terephthalic acid and at least a diol, said second bi-axially oriented polyester film comprises a polyethylene terephthalate base film, an inorganic vapor deposited layer and an optional outer protective layer directly adhered to said inorganic vapor deposited layer, said inorganic vapor deposited layer comprising an inorganic compound selected from the group consisting of oxides, nitrides and oxynitrides of Al, Ti, Si, Zn, Sn, and mixture thereof, and wherein a glue layer is interposed between said first bi-axially oriented polyester film and the inorganic vapor deposited layer or the protective layer, if present, of said second bi-axially oriented polyester film, or a white or colored laminate film comprising a first bi-axially oriented polyester film laminated to a second bi-axially oriented polyester film, wherein said first bi-axially oriented polyester film comprises a polyester base film comprising at least one polyester layer comprising one or more co-polyester(s) comprising units of terephthalic acid and at least a diol, said second bi-axially oriented polyester film comprises a polyethylene terephthalate base film, an inorganic vapor deposited layer, and an optional outer protective layer directly adhered to said inorganic vapor deposited layer, said inorganic vapor deposited layer comprising an inorganic compound selected from the group consisting of oxides, nitrides and oxynitrides of Al, Ti, Si, Zn, Sn, and mixture thereof, and wherein a glue layer is interposed between said first bi-axially oriented polyester film and the inorganic vapor deposited layer or the protective layer, if present, of said second bi-axially oriented polyester film, and an ink layer is interposed between said first bi-axially oriented polyester film and the glue layer and/or between the glue layer and said protective layer of said second bi-axially oriented polyester film, wherein said laminate film has a tear ratio, between the tear initiation force measured according to ASTM D-1004 and the total thickness of the laminate film, of at least 37 gf/micron in at least one of longitudinal and transverse direction, and a free shrink measured according to modified ISO11501-95 at 180° C. for 5 minutes lower than 5% in at least one of longitudinal and transverse direction;

characterized in that the glue layer is made of a polyurethane adhesive derived from a base resin, selected from the group consisting of polyester polyols, polyurethane polyols, polycarbonate polyols, acrylic polyols, polyether polyols and polyolefin polyols, and a curing agent comprising a polyisocyanate compound having two or more isocyanate groups in one molecule.

* * * * *